United States Patent
Choi et al.

(10) Patent No.: US 9,459,854 B2
(45) Date of Patent: Oct. 4, 2016

(54) METHOD FOR INSTALLING AT HIGH SPEED AND INITIALIZING SOFTWARE IN CLIENT PC USING CLOUD SERVER AND CLIENT LAUNCHER

(71) Applicant: SAVETEK INC., Gyeonggi-do (KR)

(72) Inventors: Seoung Il Choi, Gyeonggi-do (KR); Sung Il Kim, Seoul (KR); Jun Ho Lee, Seoul (KR)

(73) Assignee: SEOUNG IL CHOI, Gyeonggi-Do (KR)

( * ) Notice: Subject to any disclaimer, the term of this patent is extended or adjusted under 35 U.S.C. 154(b) by 0 days.

(21) Appl. No.: 14/675,029

(22) Filed: Mar. 31, 2015

(65) Prior Publication Data

US 2016/0147519 A1    May 26, 2016

(30) Foreign Application Priority Data

Nov. 21, 2014 (KR) .................. 10-2014-0163387

(51) Int. Cl.
    *G06F 9/445* (2006.01)
    *H04L 29/08* (2006.01)
    *G06F 9/44* (2006.01)

(52) U.S. Cl.
    CPC .................. *G06F 8/61* (2013.01); *G06F 9/442* (2013.01); *G06F 9/4406* (2013.01); *H04L 67/1002* (2013.01); *H04L 67/34* (2013.01)

(58) Field of Classification Search
    CPC .......... G06F 9/445; G06F 9/44; G06F 9/442; G06F 9/4406; G06F 8/61; H04L 29/06; H04L 29/08
    See application file for complete search history.

(56) References Cited

U.S. PATENT DOCUMENTS

| | | | |
|---|---|---|---|
| 6,757,894 B2* | 6/2004 | Eylon ..................... | H04L 29/06 707/999.002 |
| 7,051,315 B2* | 5/2006 | Artzi ....................... | G06F 9/445 709/201 |

(Continued)

FOREIGN PATENT DOCUMENTS

KR        100286008        1/2001

OTHER PUBLICATIONS

Eduardo M. Colaro et al., Using a File Working Set Model to Speed up the Recovery of Peer-to-Peer Backup Systems, Oct. 2008, retrieved online on Jul. 20, 2016, pp. 64-70. Retrieved from the Internet: <URL: http://delivery.acm.org/10.1145/1460000/1453788/p64-colaco.pdf?>.*

(Continued)

*Primary Examiner* — Thuy Dao
*Assistant Examiner* — Hanh T Bui
(74) *Attorney, Agent, or Firm* — IPLA P.A.; James E. Bame

(57) ABSTRACT

Provided is a method for installing at high speed and initializing software in a client PC using a cloud server and a client launcher, which is capable of preventing the waste of resources, such as PC storage spaces, by selectively installing only software required for a user in a client PC chiefly used in an organization, such as a school or a company. Furthermore, there is a method for installing at high speed and initializing software in a client PC using a cloud server and a client launcher, in which the system of a client PC can be stably maintained because the client PC is automatically initialized after software installed in the client PC is used.

4 Claims, 4 Drawing Sheets

(56) References Cited

U.S. PATENT DOCUMENTS

| | | | | |
|---|---|---|---|---|
| 2002/0087963 | A1* | 7/2002 | Eylon | H04L 29/06 717/174 |
| 2005/0108708 | A1* | 5/2005 | Im | G06F 8/61 717/178 |
| 2007/0283346 | A1* | 12/2007 | Delgrosso | G06F 8/60 717/176 |
| 2009/0049442 | A1* | 2/2009 | Shimasaki | G06F 8/61 717/174 |

OTHER PUBLICATIONS

Christine R. Hofmeister et al., A Framework For Dynamic Reconfiguration of Distribtued Programs, 1998, retrieved online on Jul. 20, 2016, pp. 1-15. Retrieved from the Internet: <URL: http://drum.lib.umd.edu/bitstream/handle/1903/595/CS-TR-3119.pdf;jsessionid=D448E6A9C332B50148D609B589E49971?sequence=2>.*

* cited by examiner

METHOD FOR INSTALLING AT HIGH SPEED AND INITIALIZING SOFTWARE IN CLIENT PC USING CLOUD SERVER AND CLIENT LAUNCHER

CROSS REFERENCE

This application claims foreign priority under Paris Convention to Korean Patent Application No. 10-2014-0163387, filed 21 Nov. 2014, with the Korean Intellectual Property Office.

BACKGROUND

The present invention relates generally to a method for installing at high speed and initializing software in a client PC using a cloud server and a client launcher and, more particularly, to a method for installing at high speed and initializing software in a client PC using a cloud server and a client launcher, which is capable of preventing the waste of resources, such as PC storage spaces, by selectively installing only software required for a user in a client PC chiefly used in an organization, such as a school or a company.

The present invention relates to a method for installing at high speed and initializing software in a client PC using a cloud server and a client launcher.

A technology, that is, a background of the present invention, relates to a software installation method for individually installing software in each client PC using a setup file that is included in a software installation CD or downloaded through the Internet.

An existing software installation method is problematic in that an installation time is long, a software installation CD may be lost, and the initial setting or options of software must be manually designated.

In particular, there is a problem in that tasks are hampered because a lot of time is taken for software installations and initial setting in places including a plurality of client PCs, for example, in organizations, such as schools and companies.

Furthermore, an existing cloud system or terminal PC separately includes the data and OS space of a client PC in a cloud server and adopts a method for fetching resources from the cloud server and using the resources. In this case, there are problems in that a problem may occur in the cloud server, a failure may occur when a license is simultaneously used, and the history of software that has been used remains intact.

A technology that is a background of the present invention is disclosed in Korean Patent Application Publication No. 10-0286008, but does not propose a fundamental solution to the aforementioned problems.

SUMMARY OF THE INVENTION

Accordingly, the present invention has been made keeping in mind the above problems occurring in the conventional art, and an object of the present invention is to provide a method for installing and initializing software in a client PC using a cloud server and a client launcher, which is capable of preventing the waste of resources, such as PC storage spaces, by selectively installing only software required for a user in a client PC chiefly used in an organization, such as a school or a company.

Another object of the present invention is to provide a method for installing at high speed and initializing software in a client PC using a cloud server and a client launcher, which is capable of stably maintaining the system of a client PC because the client PC is automatically initialized after software installed in the client PC is used.

Yet another object of the present invention is to provide a method for installing at high speed and initializing software in a client PC using a cloud server and a client launcher, which is capable of obviating a possible loss of software because an administrator does not need to keep expensive software and to distribute and recover the software and of eradicating the illegal use of software because only software purchased through a normal root can be installed.

Further yet another object of the present invention is to provide a method for installing at high speed and initializing software in a client PC using a cloud server and a client launcher, which is capable of installing required software by only one click because software to be installed in a client PC is modulated and stored in a cloud server and options for each step that are necessary to install software are fully automated.

Further yet another object of the present invention is to provide a method for installing at high speed and initializing software in a client PC using a cloud server and a client launcher, which is capable of enhancing security because modulated software is encrypted and able to be installed only in a designated client PC, a task file produced when using software installed in the client PC is encrypted and stored in a cloud server, and the task file is unable to be downloaded and open without a separate program.

In accordance with an aspect of the present invention, there is provided a method for installing at high speed and initializing software in a client PC using a cloud server and a client launcher in accordance with an embodiment of the present invention in a method of installing pieces of software in at least one client PC and recovering the client PC to the state prior to the installation of the pieces of software when the use of the software is completed. The method include steps of (a) distributing software that belongs to the pieces of software stored in a cloud server and that has been selected, modulated, and encrypted to a client server connected to the client PC over a local network; (b) an agent program, provided by the client server, being automatically installed and executed when the client PC is booted up and scanning the initial state of the client PC which includes files stored in the client PC and the registries of the client PC based on a point of time at which the agent program has been installed; (c) the initial state of the client PC 300, scanned at step (b), being encoded in a file form and uploaded to the cloud server; (d) a client launcher, provided from the client server to the client PC and executed by user selection, displaying a list of the pieces of software distributed to the client server at step (a); (e) the software that belongs to the pieces of software included in the list and that has been selected by the user being automatically installed; (f) after step (e) is completed, the agent program being automatically executed again, scanning the state of the client PC while the user uses the installed software, comparing the file of the scanned state with the file of the initial state uploaded at step (b), encoding a changed state in a file form, and uploading the changed state to the cloud server; and (g) initializing the client PC to the point of time at which the agent program was installed when the use of the software is terminated or when the client PC is terminated or rebooted.

Furthermore, at step (g), the point of time at which the agent program has been installed may be initialized to the client PC only when the client PC is terminated or rebooted after the software is normally terminated by the user.

Furthermore, the list of pieces of software displayed at step (d) may be indicated by a higher grade or high frequency of installations depending on importance of predetermined software or the number of times that the software has been installed in the client PC connected to the client server.

Furthermore, at step (g), the initialization of the client PC may be executed by a recovery driver, the recovery driver may be loaded when the client PC is booted, all the changes of the client PC may be stored as a temporary virtual file, a link to information about the disk allocation of the temporary virtual file when the client PC is terminated or rebooted may be blocked, and the software may be deleted.

Furthermore, at step (f), the encoded file may be executed in the agent program and decoded only when a predetermined password is entered.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

The merits and characteristics of the present invention and a method for achieving the merits and characteristics will become more apparent from embodiments described in detail later in conjunction with the accompanying drawings. However, the present invention is not limited to the disclosed embodiments, but may be implemented in various different ways. The embodiments are provided to only complete the disclosure of the present invention and to allow those skilled in the art to understand the category of the present invention. The present invention is defined by the category of the claims. The same reference numbers will be used to refer to the same or similar parts throughout the drawings.

A method for installing at high speed and initializing software in a client PC using a cloud server and a client launcher in accordance with embodiments of the present invention is described in detail below with reference to the accompanying drawings.

Figure 1:
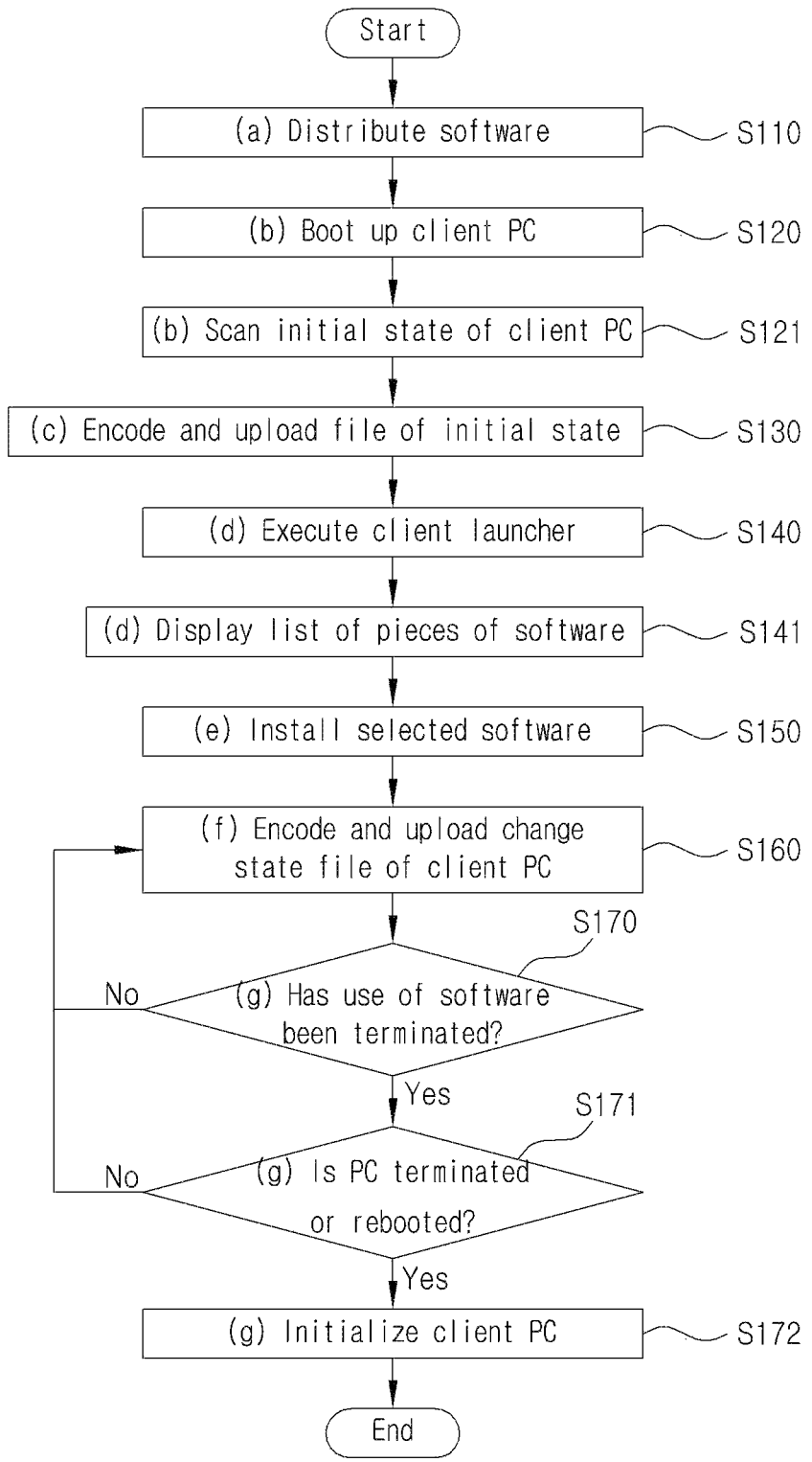
FIG. 1 is a diagram illustrating the flowchart of a method for installing at high speed and initializing software in a client PC using a cloud server and a client launcher in accordance with an embodiment of the present invention.
Figure 2:
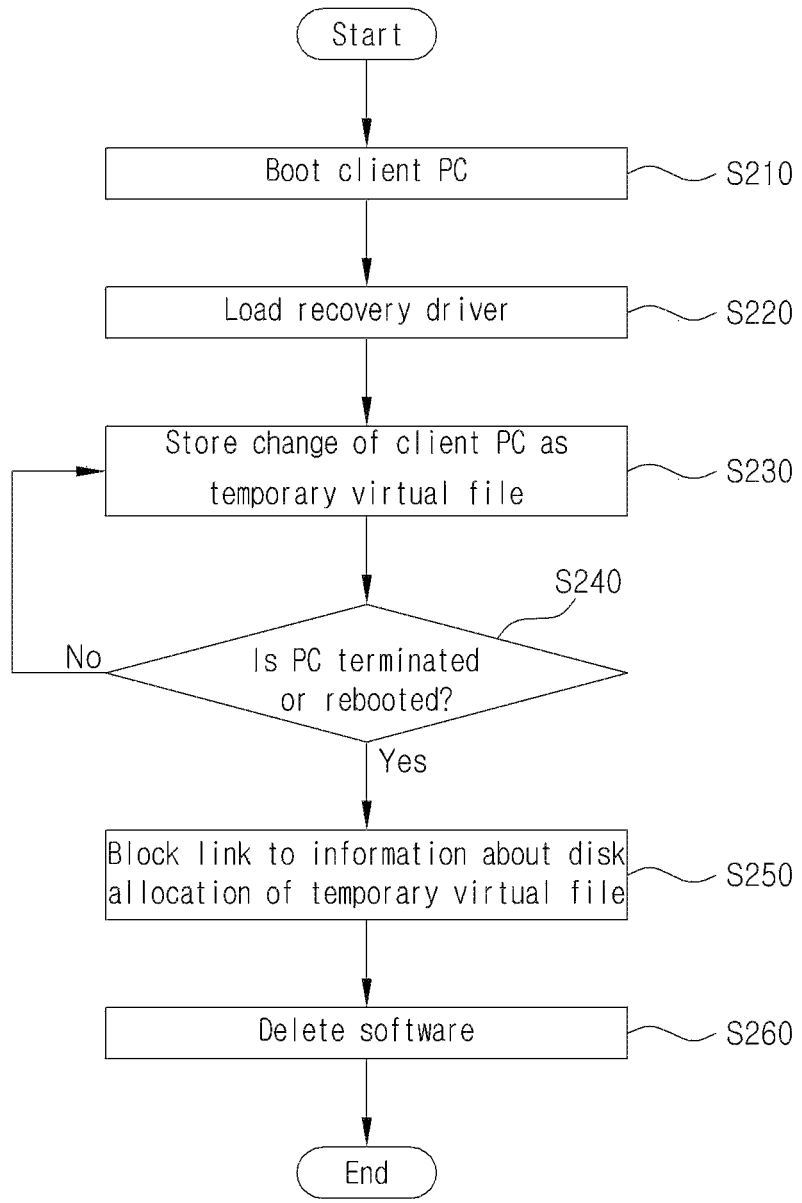
FIG. 2 is a diagram illustrating the flowchart of a method for initializing a client PC in accordance with an embodiment of the present invention.
Figure 3:
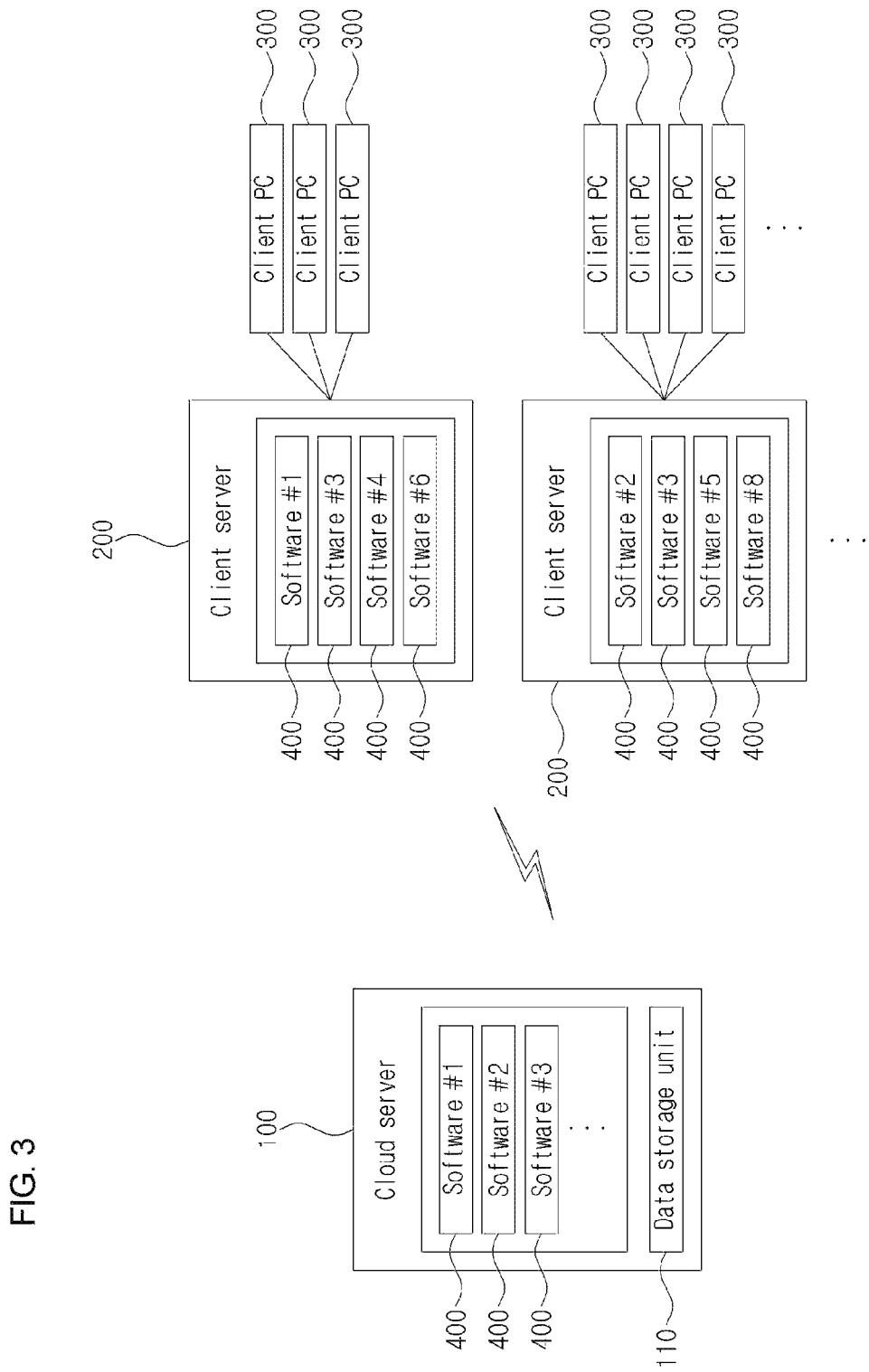
FIG. 3 is a block diagram of the cloud server and the client PC in accordance with an embodiment of the present invention.
Figure 4:
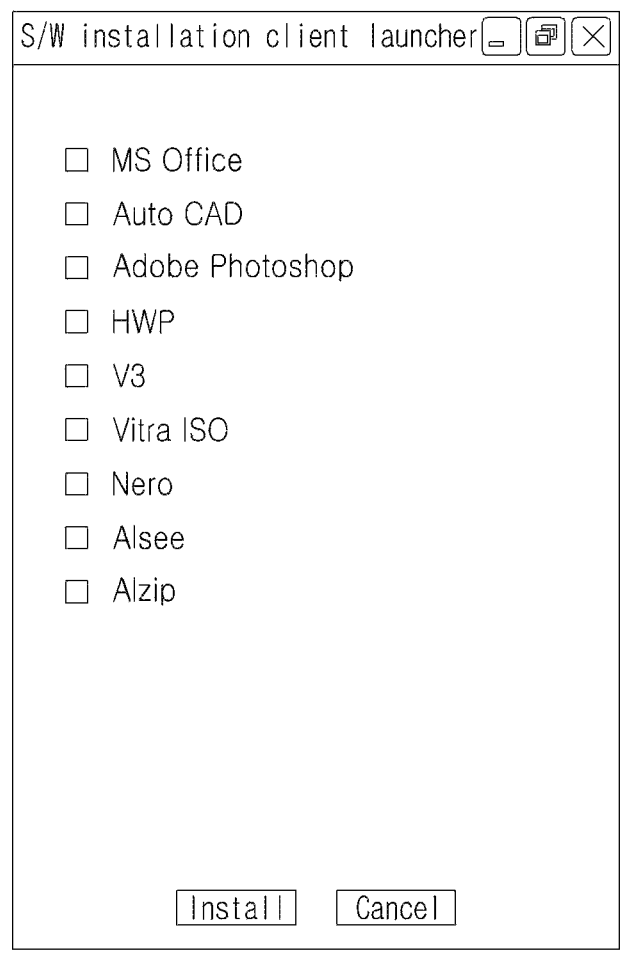
FIG. 4 is a diagram illustrating an example of a client launcher in accordance with an embodiment of the present invention.

FIG. 1 is a diagram illustrating the flowchart of a method for installing at high speed and initializing software in a client PC using a cloud server and a client launcher in accordance with an embodiment of the present invention, FIG. 2 is a diagram illustrating the flowchart of a method for initializing a client PC in accordance with an embodiment of the present invention, FIG. 3 is a block diagram of the cloud server and the client PC in accordance with an embodiment of the present invention, and FIG. 4 is a diagram illustrating an example of a client launcher in accordance with an embodiment of the present invention.

A method for installing at high speed and initializing software in a client PC using a cloud server and a client launcher in accordance with an embodiment of the present invention includes a method of installing pieces of software 400 in at least one client PC 300 and recovering the client PC 300 to the state prior to the installation of the pieces of software when the use of the software 400 is completed. The method include steps of (a) distributing software 400 that belongs to the pieces of software 400 stored in a cloud server 100 and that has been selected, modulated, and encrypted to a client server 200 connected to the client PC 300 over a local network; (b) an agent program, provided by the client server 200, being automatically installed and executed when the client PC 300 is booted up and scanning the initial state of the client PC 300 which includes files stored in the client PC 300 and the registries of the client PC 300 based on a point of time at which the agent program has been installed; (c) the initial state of the client PC 300, scanned at step (b), being encoded in a file form and uploaded to the cloud server 100; (d) a client launcher, provided from the client server 100 to the client PC 300 and executed by user selection, displaying a list of the pieces of software 400 distributed to the client server 200 at step (a); (e) the software 400 that belongs to the pieces of software 400 included in the list and that has been selected by the user being automatically installed; (f) after step (e) is completed, the agent program being automatically executed again, scanning the state of the client PC 300 while the user uses the installed software 400, comparing the file of the scanned state with the file of the initial state uploaded at step (b), encoding a changed state in a file form, and uploading the changed state to the cloud server 100; and (g) initializing the client PC 300 to the point of time at which the agent program was installed when the use of the software 400 is terminated or when the client PC 300 is terminated or rebooted.

That is, in order to install at high speed and initialize software in a client PC using the cloud server 100 and the client launcher, first, software that belongs to the pieces of software 400 previously stored in the cloud server 100 and that is to be used in at least one client PC 300 is modulated, encrypted, and distributed to the client server 200 connected to the client PC 300 over a local network at step S110. Thereafter, when the client PC 300 is booted up by a user at step S120, an agent program provided by the client server 200 is automatically installed and executed, and scans the initial state of the client PC 300 at step S121. The file of the initial state of the client PC 300, including files stored in the scanned client PC 300 and the registries of the client PC 300, is encoded and uploaded to the data storage unit 110 of the cloud server 100 at step S130. Thereafter, when the client launcher is executed by a user' selection at step S140, a list of the pieces of software distributed to the client server 200 at step S110 are displayed at step S141. Software that belongs to the list of pieces of software and that has been selected by the user is automatically installed at step S150. Thereafter, the agent program is automatically executed again, and the changed state of the client PC 300 is encoded in a file form and uploaded to the data storage unit 110 at step S160. Thereafter, when the use of the software is terminated at step S170 and when the client PC 300 is terminated or rebooted at step S171, the client PC 300 is initialized at step S172.

The cloud server 100 commonly refers to the server of a service provider because the server of a computing service provider is indicated in a cloud shape and stores software and data in a central computer connected to the Internet so that the software and data can be used anywhere and at any time when the Internet has only to be accessed.

That is, the cloud server 100 is a computing environment in which IT-related services, such as data storage, networks, and content use, may be used at once. If a company introduces the cloud server 100, great expenses, such as costs for the maintenance and management of computer systems, costs for the purchase and installations of OSs and servers, update costs, and software purchase costs, and time and manpower can be reduced. Furthermore, energy can also be reduced.

Furthermore, if data is stored in a PC, it may be lost due to the failure of a hard disk. Since the cloud server 100 is an external server, data can be safely stored, a limit to a storage space can be overcome, and his or her documents can be read and modified anywhere and at any time.

Furthermore, the local network may refer to an information communication network within a company or a communication network over which computers or office automation devices within a relatively short distance within the same company, factory, or building are interconnected for efficiency utilization.

The client server 200 is one of computing methods in which a single central computer processes files and programs that may be shared by many client PCs interconnected over the local network, and refers to a distributed processing system method of accessing small-sized computers, such as PCs and workstations, over a network and distributing and processing data. In this case, the server has a management function for sharing databases and printers over a network, and the client refers to a terminal for enabling a user to use the management function. In general, a workstation is used as a server, and a PC is used as a client. In recent years, a PC having improved performance is frequently used as a server.

The list of pieces of software 400 displayed at step S141 may be indicated by a higher grade or high frequency of installations depending on importance of predetermined software or the number of times that the software 400 has been installed in the client PC 300 connected to the client server 200.

That is, the pieces of software 400 are arranged in order of time when the pieces of software 400 are distributed to the client server 200, but may be arranged in order of frequency of installations of the software 400 in a cycle designated by a user. In this case, a user may easily select his or her software to be installed in the client PC 300 because pieces of software are arranged in order of software that has been most frequently selected by a plurality of users within a single organization that shares the client server 200.

Furthermore, the file encoded at step S160 may be executed by an agent program and decoded only when a predetermined password is entered.

That is, the encoded file may be executed only by the agent program provided by the client server 200 and may be decoded and read only when a predetermined password is entered.

In this case, the changed file at step S160 may include files generated when the user uses the software 400 and the changed registries of the client PC 300. The registries correspond to a database in which system configuration information has been stored and store the type of processor, the capacity of a primary storage device, information about accessed peripheral devices, system parameters, and file type and parameters handled by application software. Furthermore, when a user changes the environment configurations of a system or installs new software, information about a corresponding change is incorporated into a corresponding registry.

Furthermore, since the software 400 distributed to the client server 200 is also modulated, encrypted, and distributed, it may not be decoded if the client PC 300 has not been designated or an agent program provided by the client server 200 has not been installed. Accordingly, the software 400 may not be used although it is externally drained from the client server 200.

In this case, the modulation of the software 400 means that software is set to be automatically installed in the client PC 300 by only one click without a need to manually designate the initial setting or options of the software when the setup file of the software is executed.

At step S170, only when the client PC 300 is terminated or rebooted after a user normally finishes the software 400, the client PC 300 may be initialized to the point of time at which the agent program has been installed.

For example, only when a user's click on the end button of the software 400 is recognized or a user clicks on a check button in a pop-up window, the client PC 300 may be initialized to the point of time at which the agent program has been installed.

In this case, a forced end or rebooting attributable to an unexpected error of a system can be prevented.

Furthermore, at step S172, the initialization of the client PC 300 may be executed by a recovery driver. When the client PC 300 is booted up, the recovery driver may be loaded, and all the changes of the client PC 300 may be stored as a temporary virtual file. When the client PC 300 is terminated or rebooted, a link to information about the disk allocation of the temporary virtual file may be blocked, and the software 400 may be deleted.

That is, first, the client PC 300 may be booted up at step S210. The recovery driver may be automatically loaded on to the main memory of the client PC 300 at step S220. A change of the client PC 300 may be stored as a temporary virtual file at step S230. When the client PC 300 is terminated or rebooted at step S240, a link to information about the disk allocation of the temporary virtual file may be blocked at step S250, and software installed in the client PC 300 may be deleted at step S260.

In this case, the loading means that a required program or data is moved from an auxiliary storage device or input device to a primary storage device.

As described above, in accordance with an embodiment of the present invention, there can be provided the method for installing and initializing software in a client PC using a cloud server and a client launcher, which is capable of preventing the waste of resources, such as PC storage spaces, because only software required for a user is selectively installed in a client PC chiefly used in an organization, such as a school or a company.

Furthermore, in accordance with an embodiment of the present invention, there can be provided the method for installing at high speed and initializing software in a client PC using a cloud server and a client launcher, in which the system of a client PC can be stably maintained because the client PC is automatically initialized after software installed in the client PC is used.

Furthermore, in accordance with an embodiment of the present invention, there can be provided the method for installing at high speed and initializing software in a client PC using a cloud server and a client launcher, which is capable of obviating a possible loss of software because an administrator does not need to keep expensive software and to distribute and recover the software and of eradicating the illegal use of software because only software purchased through a normal root can be installed.

Furthermore, in accordance with an embodiment of the present invention, there can be provided the method for installing at high speed and initializing software in a client PC using a cloud server and a client launcher, wherein required software can be installed by only one click because software to be installed in a client PC is modulated and stored in a cloud server and options for each step that are necessary to install software are fully automated.

Furthermore, in accordance with an embodiment of the present invention, there can be provided the method for installing at high speed and initializing software in a client PC using a cloud server and a client launcher, which is capable of enhancing security because modulated software is encrypted and able to be installed only in a designated client PC, a task file produced when using software installed in the client PC is encrypted and stored in a cloud server, and the task file is unable to be downloaded and open without a separate program.

Those skilled in the art to which the present invention pertains will appreciate that the present invention may be implemented in other detailed forms without departing from the technical spirit or essential characteristics of the present invention. Accordingly, the aforementioned embodiments should be understood as being only illustrative, but should not be understood as being restrictive from all aspects. The scope of the present invention is defined by the following claims rather than the detailed description, and the meanings and scope of the claims and all changes or modified forms derived from their equivalents should be construed as falling within the scope of the present invention.

What is claimed is:

1. A method for installing at high speed and initializing software in a client PC using a cloud server and a client launcher in a method of installing pieces of software in at least one client PC and recovering the client PC to a state prior to the installation of the pieces of software when a use of the software is completed, the method comprising steps of:

(a) distributing software that belongs to the pieces of software stored in a cloud server and that has been selected, modulated, and encrypted to a client server connected to the client PC over a local network;

(b) an agent program, provided by the client server, being automatically installed and executed when the client PC is booted up and scanning an initial state of the client PC which comprises files stored in the client PC and registries of the client PC based on a point of time at which the agent program has been installed;

∈ the initial state of the client PC, scanned at step (b), being encoded in a file form and uploaded to the cloud server;

(d) a client launcher, provided from the client server to the client PC and executed by user selection, displaying a list of the pieces of software distributed to the client server at step (a);

∈ the software that belongs to the pieces of software included in the list and that has been selected by the user being automatically installed;

(f) after step ∈ is completed, the agent program being automatically executed again, scanning a state of the client PC while the user uses the installed software, comparing the file of the scanned state with the file of the initial state uploaded at step (b), encoding a changed state in a file form, and uploading the changed state to the cloud server; and (g) initializing the client PC to the point of time at which the agent program has been installed when the use of the software is terminated or when the client PC is terminated or rebooted, wherein at step (g), the initialization of the client PC is executed by a recovery driver, the recovery driver is loaded when the client PC is booted, all changes of the client PC are stored as a temporary virtual file, a link to information about disk allocation of the temporary virtual file when the client PC is terminated or rebooted is blocked, and the software is deleted.

2. The method of claim 1, wherein at step (g), the point of time at which the agent program has been installed is initialized to the client PC only when the client PC is terminated or rebooted after the software is normally terminated by the user.

3. The method of claim 1, wherein the list of pieces of software displayed at step (d) is indicated by a higher grade or high frequency of installations depending on importance of predetermined software or a number of times that the software has been installed in the client PC connected to the client server.

4. The method of claim 1, wherein, at step (f), the encoded file is executed in the agent program and decoded only when a predetermined password is entered.

* * * * *